United States Patent
Peck et al.

(10) Patent No.: US 12,202,307 B2
(45) Date of Patent: Jan. 21, 2025

(54) TRAILER HITCH COVER RETENTION AND RELEASE FEATURE

(71) Applicants: Magna Exteriors Inc., Concord (CA); Lee Peck, Pinckneyville, IL (US)

(72) Inventors: Lee Peck, Pinckneyville, IL (US); Dan Pauluk, Macomb Township, MI (US); Rakesh Udupa, Madison Heights, MI (US)

(73) Assignee: Magna Exteriors Inc., Aurora (CA)

( * ) Notice: Subject to any disclaimer, the term of this patent is extended or adjusted under 35 U.S.C. 154(b) by 550 days.

(21) Appl. No.: 17/611,661

(22) PCT Filed: May 15, 2020

(86) PCT No.: PCT/US2020/033168
§ 371 (c)(1),
(2) Date: Nov. 16, 2021

(87) PCT Pub. No.: WO2020/236608
PCT Pub. Date: Nov. 26, 2020

(65) Prior Publication Data
US 2022/0258551 A1 Aug. 18, 2022

Related U.S. Application Data

(60) Provisional application No. 62/849,543, filed on May 17, 2019.

(51) Int. Cl.
*B60D 1/60* (2006.01)
(52) U.S. Cl.
CPC ..................... *B60D 1/60* (2013.01)

(58) Field of Classification Search
CPC ........................................................ B60D 1/60
USPC ........................................................ 293/106
See application file for complete search history.

(56) References Cited

U.S. PATENT DOCUMENTS

| | | | |
|---|---|---|---|
| 6,581,955 B2 * | 6/2003 | Aquinto | B60D 1/485 |
| | | | 293/106 |
| 6,874,806 B1 * | 4/2005 | Blake | B60D 1/60 |
| | | | 280/507 |
| 7,891,714 B2 * | 2/2011 | Takemura | B60D 1/60 |
| | | | 280/507 |
| 9,663,049 B2 * | 5/2017 | Weigand | B60D 1/60 |
| 2004/0104557 A1 | 6/2004 | Kaepp et al. | |

(Continued)

FOREIGN PATENT DOCUMENTS

| | | |
|---|---|---|
| CN | 107672395 A | 2/2018 |
| DE | 20201610638 U1 | 1/2017 |
| WO | 2017125045 A1 | 7/2017 |

OTHER PUBLICATIONS

International Search Report for PCT/US2020/033168 dated Aug. 31, 2020, 2-pages.

*Primary Examiner* — Kevin Hurley
(74) *Attorney, Agent, or Firm* — Warn Partners, P.C.

(57) ABSTRACT

Provided is a removable cover (10) for the trailer hitch area of a vehicle such as an SUV, pickup truck or other vehicle (11). A fascia (12) having an opening (14) for allowing access for a trailer hitch area of a vehicle is provided. A cover member (16) for removably covering the opening (14) is operative for being secured in the opening (14). The cover member includes a lock mechanism for being received in the fascia, said lock mechanism including a depressible button release mechanism (18).

17 Claims, 6 Drawing Sheets

(56) References Cited

U.S. PATENT DOCUMENTS

2009/0039618 A1 2/2009 Takemura
2010/0176617 A1 7/2010 Khazaal et al.

* cited by examiner

TRAILER HITCH COVER RETENTION AND RELEASE FEATURE

CROSS-REFERENCE TO RELATED APPLICATIONS

This application is a National Stage of PCT International Application No. PCT/US2020/033168, filed May 15, 2020, which claims the benefit of U.S. Provisional Patent Application No. 62/849,543, filed May 17, 2019. The disclosures of the above applications are incorporated herein by reference.

FIELD OF THE INVENTION

The present invention relates to trailer hitch cover retention and release feature.

BACKGROUND OF THE INVENTION

Trailer hitch covers and tow hook covers are specified as removable in many OEM vehicles. This allows the area to be covered for aesthetic purposes but accessible when necessary for utilitarian purposes. Therefore, covers are desired for hiding the area. It is desired to have these covers removable for the final user.

Various types of removable securement devices have been used in the past, but they have drawbacks in either assembly, use or cost considerations. Some vehicles use a quarter turn fastener seated into the fascia, so that you can remove the trailer hitch cover. The added cost of a quarter turn fastener is undesirable in some vehicle applications. After repeated use such fasteners the parts tend to wear and the fasteners do not provide the desired longevity. While it may be possible to make the design more robust it adds further cost and weight to the item.

Barbed snaps are sometimes use in the plastic parts that need to be designed to stay in place without rattling or falling off. However, snaps can break and are not easily removed by a user. Additionally, the designs of such snap fasteners require many tuning steps during assembly in production in order to dial in the right balance of retention force and removal force. This slows production and adds additional assembly costs. Final proper assembly is also subjective. This causes some unpredictability as to force of holding and force necessary for removal of the panel. Also, with this type of snap it is not evident to the end user on how to remove the cover which leads to potential dis-satisfaction with the final user.

Therefore it is a goal in the art to provide a lower cost positive snap engagement that does not require as much tuning, is easy for an end user to use and also saves costs in assembly while retaining sufficient forces for retaining the hitch cover in place.

SUMMARY OF THE INVENTION

In accordance with the present invention there is provided a removable cover for the trailer hitch area of a vehicle. A fascia having an opening for allowing access for a trailer hitch area of a vehicle is provided. A cover member for removably covering the opening is operative for being secured in the opening. The cover member includes a lock mechanism for being received in the fascia, said lock mechanism including a depressible button release mechanism.

The fascia has at least one opening to the exterior for receiving the button, such that the locking mechanism for said cover member can be released by depressing said button.

The push-to-release snap buttons require the user to depress buttons with their finger prior to pulling the trailer hitch cover or tow hook cover out of their slots. This will be less expensive than the quarter turn fastener concept. It will also be less expensive in tooling as there would be fewer tuning loops required to dial in the retention/removal force balance. This option also would improve customer satisfaction, while reducing the risk of degradation over life of vehicle.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1:
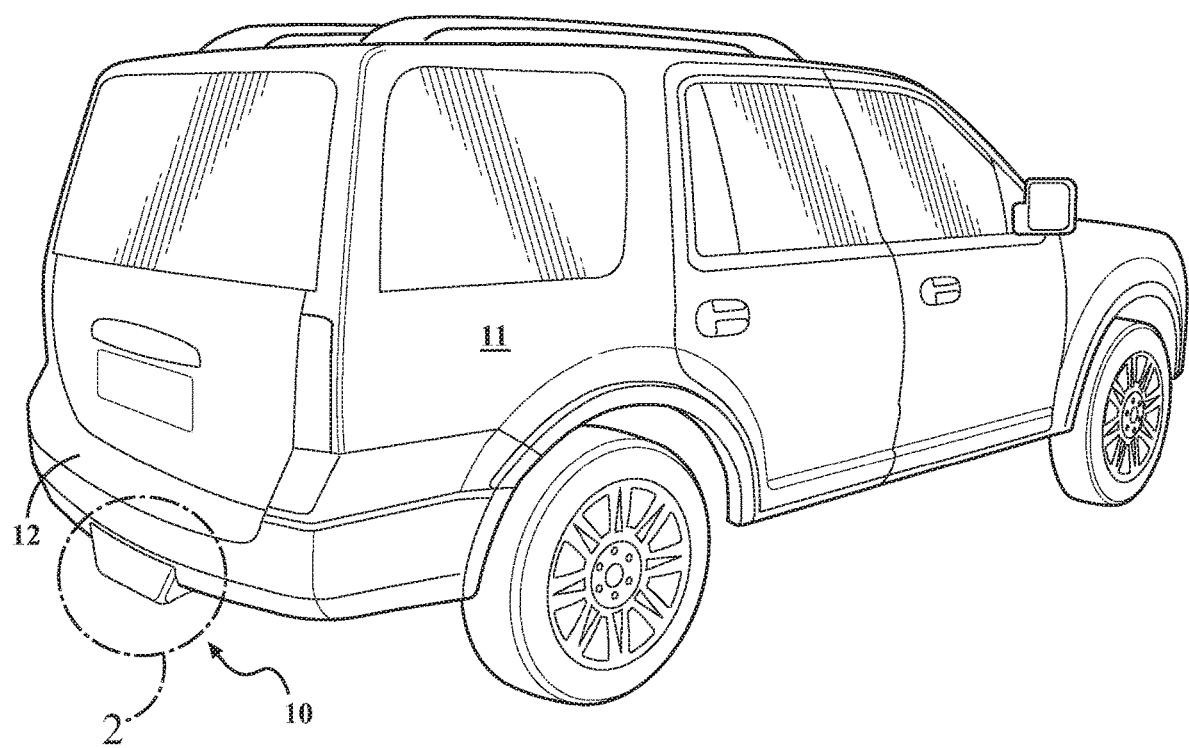
FIG. 1 is a perspective view of a vehicle having a trailer hitch cover in accordance with the present invention.
Figure 2:
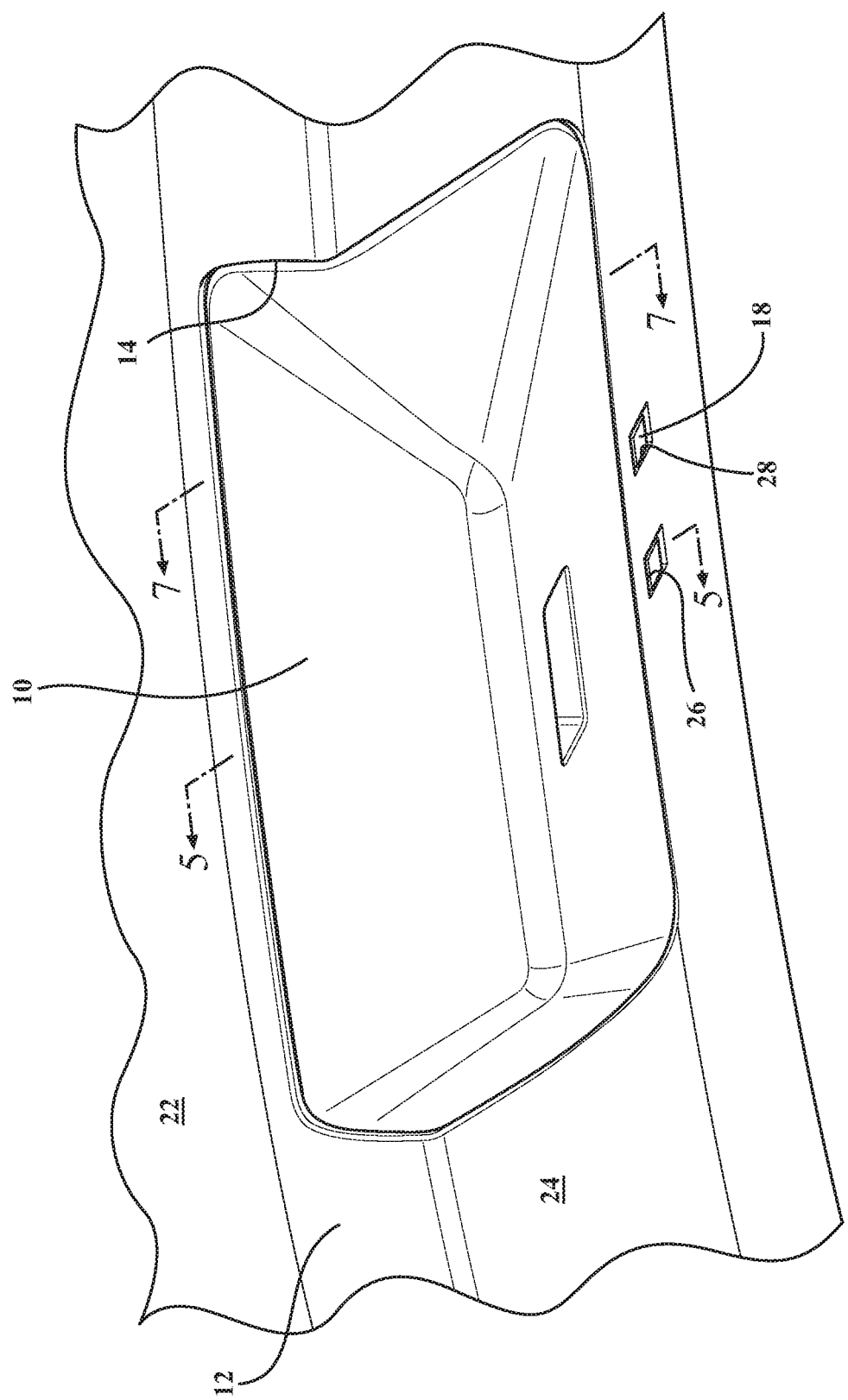
FIG. 2 is a detailed view of the area of the trailer hitch cover area "2" of the vehicle of FIG. 1.
Figure 3:
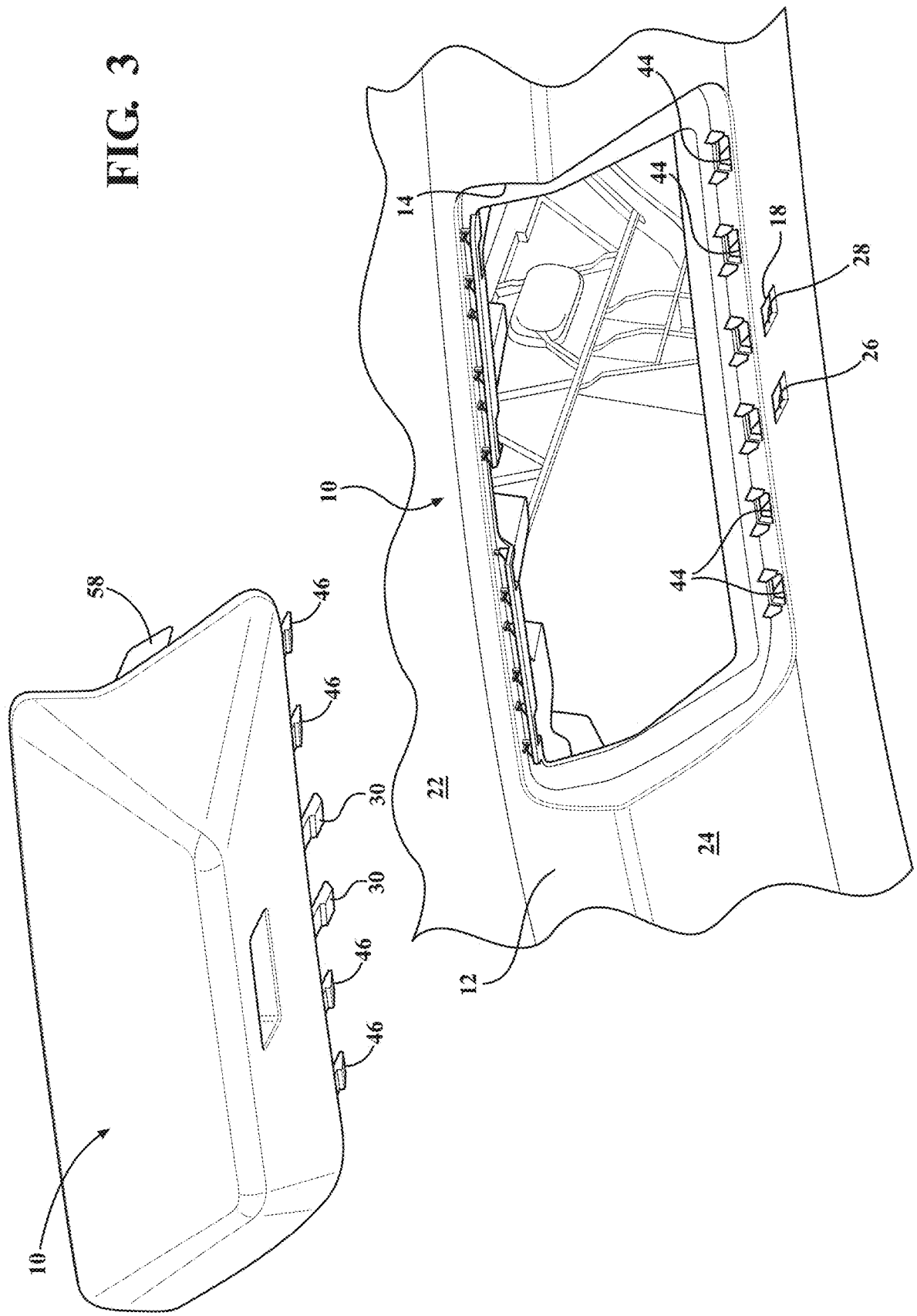
FIG. 3 is an exploded perspective view of the cover and fascia.
Figure 4:
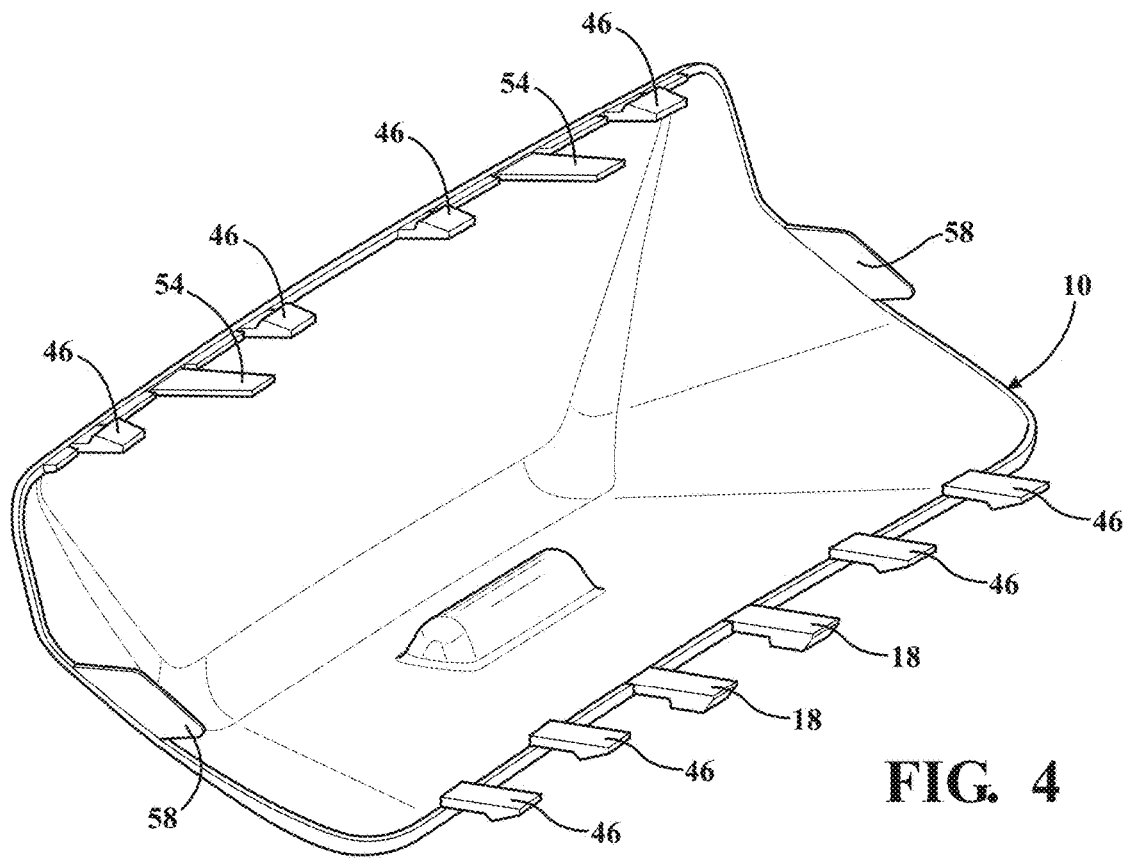
FIG. 4 is a perspective view of the rear of the cover.
Figure 6:
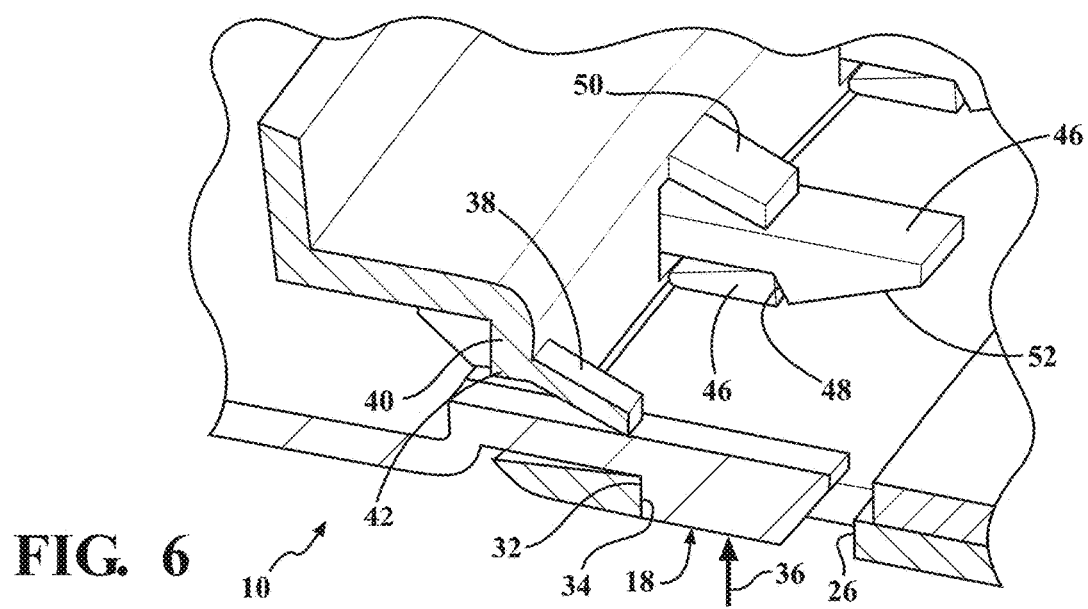
FIG. 6 is a detailed sectional perspective view, partially broken away, of the button lock portion of FIG. 5; and, FIG. 7 is a detailed sectional perspective view, partially broken away, of alignment and retention tab mechanisms utilized in the present invention.
Figure 5:
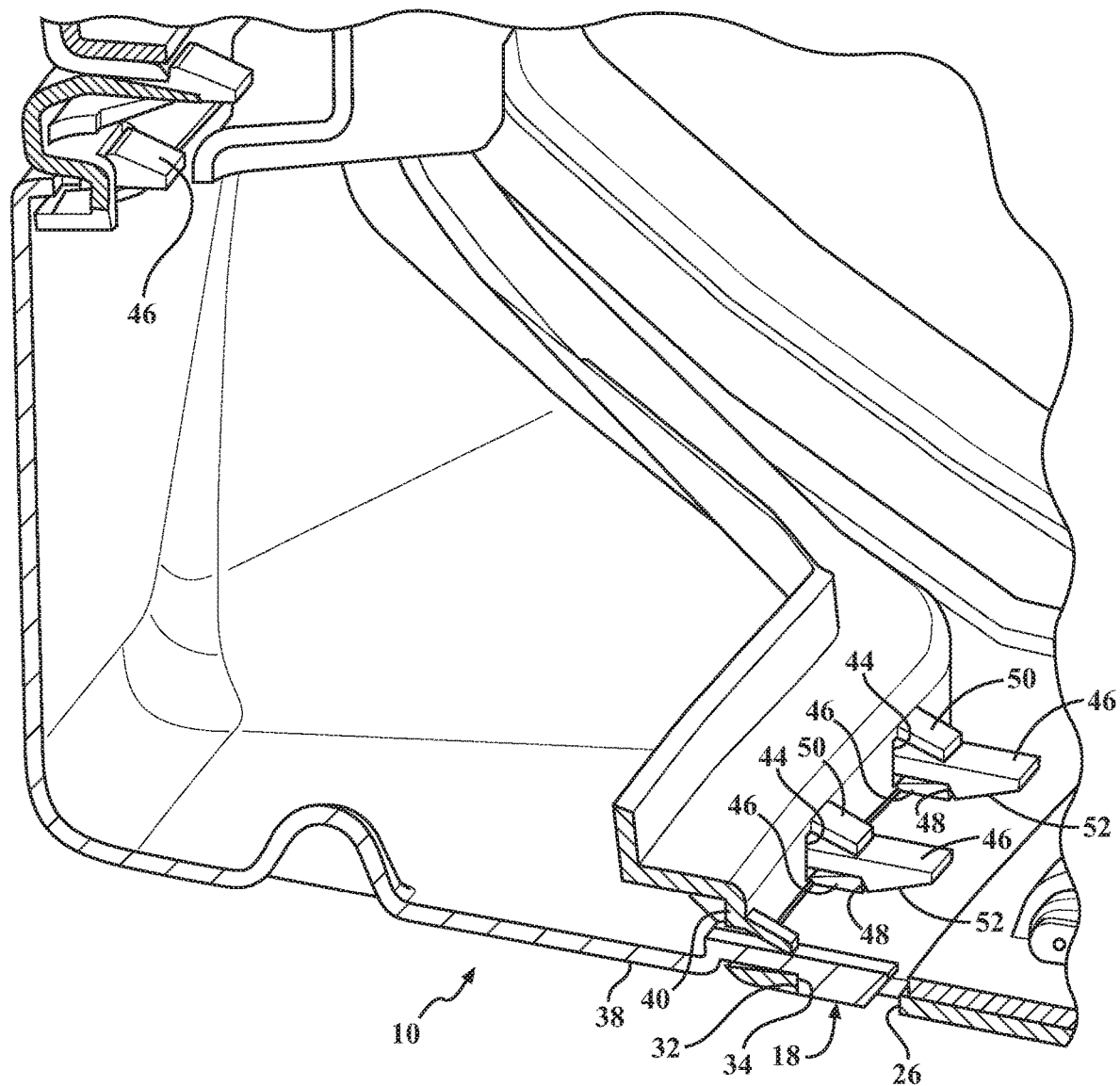
FIG. 5 is a detailed sectional perspective view, partially broken away, of FIG. 1 showing the button lock mechanism.
Figure 7:
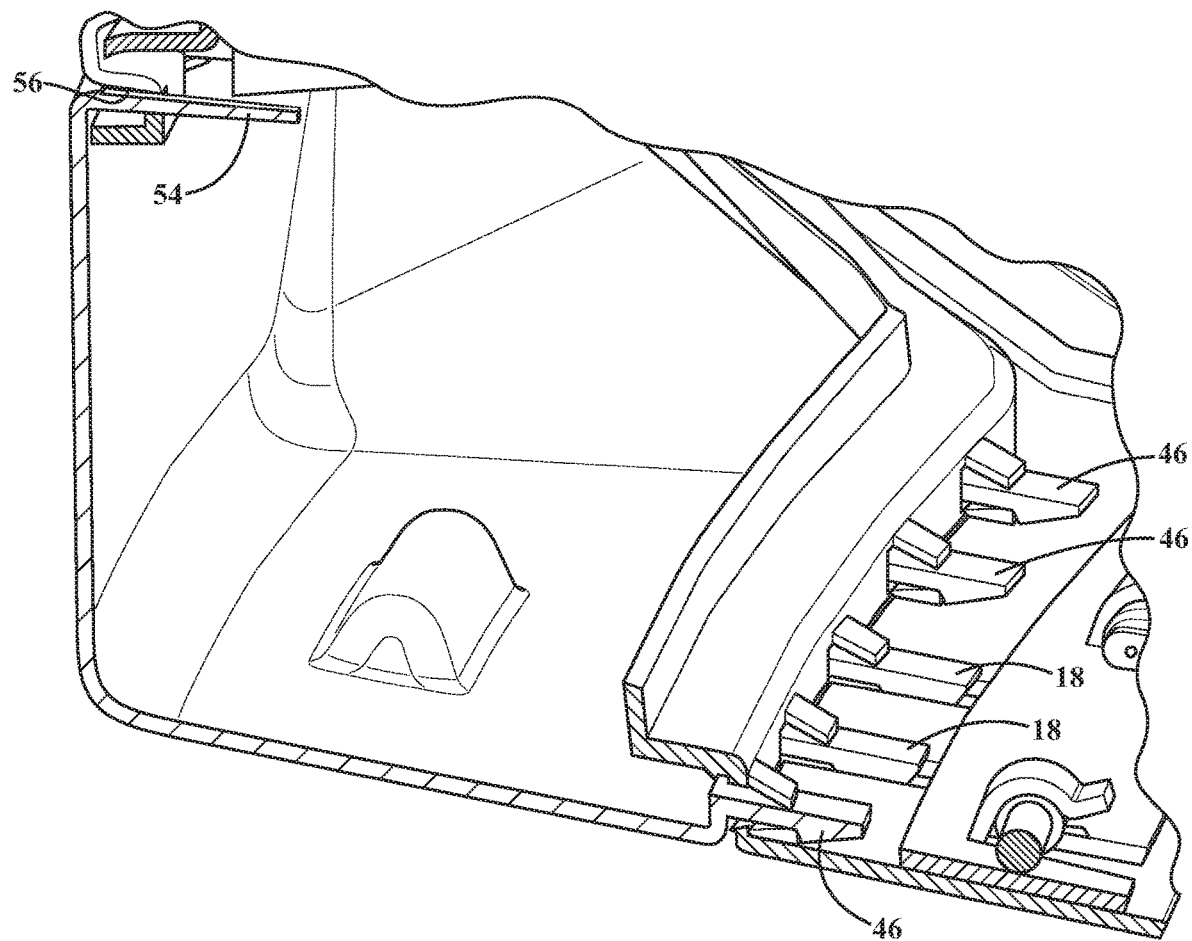

The following description of the preferred embodiment(s) is merely exemplary in nature and is in no way intended to limit the invention, its application, or uses.

In accordance with the present invention there is provided a removable cover generally indicated at 10 for the trailer hitch area of a vehicle such as an SUV, pickup truck or other vehicle generally indicated at 11. A fascia 12 having an opening 14 for allowing access for a trailer hitch area of a vehicle is provided. A cover member 16 for removably covering the opening 14 is operative for being secured in the opening 14. The cover member 16 includes a lock mechanism generally indicated at 18 for being received in the fascia, said lock mechanism including a depressible button release mechanism 20.

The fascia pictured is of a rear bumper area of a vehicle and as shown has an upper fascia 22 and a lower fascia 24 portion. The lower portion 24 has at least one opening 14 where a trailer hitch receiver is found and is generally in the center area of the fascia and bumper area. The fascia includes a button engagement aperture (two are illustrated 26 and 28 to the exterior for receiving the button 30. Button 30 has a locking edge 32 which engages edge 34 in the aperture 26, 28 such that the locking mechanism for said cover member can be released by depressing said button in direction of the arrow 36.

The fascia 24 includes an upwardly extending wall member 40 with a slot 42 in it, a resilient arm 38 is provided. The button member is inserted through the slot 42 and biased into the opening 26, 28 by the resilient arm 38. Locking surfaces 32 and 34 provide an interference lock acting against removal of the cover member until the buttons are depressed. When release of the panel is desired the button(s) 30 are depressed, deflecting the resilient arm 38 and freeing the locking edge 32 so that the locking button can be removed through slot 42 which allows removal of the hitch cover panel from the fascia.

As can be seen in the drawings the fascia has tab boxes 44 for receiving a second set of retention tangs 46. The tangs 46 have a slanted face 48 which cooperates with the tensioning tab 50 and which is deflectable off the bottom of the box 44. Slanted face 52 allows insertion into the tab boxes 44. Elongated retention tabs 54 are provided for locating the hitch cover panel 10 in position. Side location tabs are 58 are provided for location of the sides of the door 18.

The push-to-release snap buttons require the user to depress buttons with their finger prior to pulling the trailer hitch cover or tow hook cover out of their slots. This will be less expensive than the quarter turn fastener concept. It will also be less expensive in tooling as there would be fewer tuning loops required to dial in the retention/removal force balance. This option also would improve customer satisfaction, while reducing the risk of degradation over life of vehicle.

The shown design has two buttons, but this could also be a singular oval shape, or any other plurality of buttons as desired. This does require a hole in the skin of the fascia component for the push-to-release buttons to protrude through. The buttons can be flush to the fascia skin component; however, it will be a visible button so that the end user knows to depress those to release the cover.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A removable cover for the trailer hitch area of a vehicle comprising:
    A fascia having an opening for allowing access for a trailer hitch area of a vehicle;
    A cover member for removably covering said opening, said cover member having a lock mechanism for being received in the fascia, said lock mechanism including a depressible button release mechanism;
    Said fascia including at least one opening to the exterior for receiving said button, wherein, the locking mechanism for said cover member can be released by depressing said depressible button release mechanism; and
    wherein the fascia has an extending lip portion with a slot adjacent the opening wherein said depressible button release mechanism slides into the slot for engaging the opening and locking the panel in place.

2. The removable cover of claim 1 wherein a resilient finger is provided for biasing the depressible button release mechanism into the opening in the fascia for positive interference locking in the fascia and allowing deflection of the resilient finger for removing of the depressible button release mechanism through the slot and releasing the cover from the fascia.

3. The removable cover of claim 1 wherein the cover is releasably affixed at a second edge portion to said fascia opening.

4. The removable cover of claim 1 wherein the cover includes a barbed fastener releasably engaged in an orifice of the fascia.

5. The removable cover of claim 1 further comprising a plurality of button lock mechanisms.

6. The removable cover of claim 1 further comprising at least one locator tab for helping to align and locate the cover during removal and insertion of the cover.

7. The removable cover of claim 6 wherein at least two of the locator tabs are provided.

8. A removable cover for the trailer hitch area of a vehicle comprising:
    A fascia having an opening for allowing access for a trailer hitch area of a vehicle;
    A cover member for removably covering said opening, said cover member having a lock mechanism for being received in the fascia, said lock mechanism including a depressible button release mechanism;
    Top and side location tab members for alignment of the cover; and
    Said fascia including at least one opening to the exterior for receiving said depressible button release mechanism, wherein, the locking mechanism for said cover member can be released by depressing said depressible button release mechanism.

9. The removable cover of claim 8 wherein the fascia has an extending lip portion with a slot adjacent the opening wherein said button slides into the slot for engaging the opening and locking the panel in place.

10. The removable cover of claim 9 wherein a resilient finger is provided for biasing the button into the opening in the fascia for positive interference locking in the fascia and allowing deflection of the tab for removing of the depressible button release mechanism through the slot and releasing the cover from the fascia.

11. The removable cover of claim 8 wherein the cover is releasably affixed at a second edge portion to said fascia opening.

12. The removable cover of claim 11 wherein the cover includes a barbed fastener releasably engaged in an orifice of the fascia.

13. The removable cover of claim 8 further comprising a plurality of button lock mechanisms.

14. The removable cover of claim 8 wherein at least two of the locator tabs are provided on the top and bottom.

15. The removable cover of claim 8 wherein at least two of the locator tabs are provided.

16. The removable cover of claim 15 wherein at least two of the locator tabs are provided, one on each side of the cover.

17. A cover member for removably covering a trailer hitch area opening in a fascia, said cover member having a lock mechanism for being received in the fascia, said lock mechanism including at least two button lock mechanisms wherein a resilient finger is provided for biasing the two button lock mechanisms into the opening in the fascia for positive interference locking in the fascia and allowing deflection of the resilient finger for removing of the two button lock mechanisms through the opening and releasing the cover from the fascia;
    Top and side location tab members for alignment of the cover member; and
    Said fascia including at least one opening to the exterior for receiving said two button lock mechanisms wherein, the locking mechanism for said cover member can be released by depressing said two button lock mechanisms.

\* \* \* \* \*